US009349329B2

(12) United States Patent
Chen et al.

(10) Patent No.: US 9,349,329 B2
(45) Date of Patent: May 24, 2016

(54) DISPLAYS WITH LIGHT LEAKAGE REDUCTION STRUCTURES

(71) Applicant: Apple Inc., Cupertino, CA (US)

(72) Inventors: Cheng Chen, San Jose, CA (US); Nicholas A. Rundle, San Jose, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 13/927,521

(22) Filed: Jun. 26, 2013

(65) Prior Publication Data

US 2015/0002563 A1    Jan. 1, 2015

(51) Int. Cl.
G09G 3/36 (2006.01)
G09G 3/34 (2006.01)
G02F 1/1335 (2006.01)
G02F 1/1333 (2006.01)
F21V 8/00 (2006.01)

(52) U.S. Cl.
CPC ............ *G09G 3/36* (2013.01); *G02F 1/133512* (2013.01); *G09G 3/3406* (2013.01); *G02B 6/0061* (2013.01); *G02F 2001/133388* (2013.01); *G02F 2001/133601* (2013.01); *G09G 2310/0232* (2013.01); *G09G 2320/0238* (2013.01)

(58) Field of Classification Search
CPC ............... G02F 1/133606; G09G 3/36; G06G 2320/0238
USPC ..................................... 345/89, 102
See application file for complete search history.

(56) References Cited

U.S. PATENT DOCUMENTS

| 8,354,992 | B2 | 1/2013 | Rumreich et al. | |
|---|---|---|---|---|
| 8,384,652 | B2 | 2/2013 | Shih et al. | |
| 2006/0066782 | A1 * | 3/2006 | Ikeno | G02F 1/136227 349/113 |
| 2007/0030222 | A1 | 2/2007 | Lee et al. | |
| 2011/0063490 | A1 * | 3/2011 | Ogita | G02F 1/133536 348/333.01 |
| 2011/0141003 | A1 * | 6/2011 | Kim | G09G 3/342 345/102 |
| 2011/0279749 | A1 * | 11/2011 | Erinjippurath | G09G 3/3426 349/61 |
| 2011/0316867 | A1 * | 12/2011 | Lum | G09G 3/3622 345/549 |
| 2012/0200485 | A1 | 8/2012 | Uchibe | |
| 2012/0268505 | A1 * | 10/2012 | Tani | G09G 3/342 345/694 |
| 2013/0257922 | A1 * | 10/2013 | Park | G09G 3/3426 345/690 |

FOREIGN PATENT DOCUMENTS

WO    2005015533    2/2005

* cited by examiner

*Primary Examiner* — Jonathan Blancha
(74) *Attorney, Agent, or Firm* — Treyz Law Group, P.C.; Kendell P. Woodruff; Joseph F. Guihan

(57) ABSTRACT

An electronic device is provided with a display such as a liquid crystal display. The display includes a display module having an array of display pixels and a backlight unit configured to provide backlight to the array of display pixels. The array of display pixels includes display pixels in a central region surrounded by display pixels in a border region. To minimize light leakage from the display, display control circuitry drives the display pixels in the central region according to a first gray level mapping function and drives the display pixels in the border region according to a second gray level mapping function. Light leakage reduction structures may be used to reduce the intensity of backlight received by display pixels in the border region relative to the intensity of backlight received by display pixels in the central region.

19 Claims, 11 Drawing Sheets

DISPLAYS WITH LIGHT LEAKAGE REDUCTION STRUCTURES

BACKGROUND

This relates generally to displays, and, more particularly, to displays such as liquid crystal displays.

Displays are widely used in electronic devices to display images. Displays such as liquid crystal displays display images by controlling liquid crystal material in the display using electrodes associated with an array of image pixels. In a typical liquid crystal display, the liquid crystal material is formed between a glass layer with an array of thin-film transistor circuits and a glass layer with an array of color filter elements.

Portions of a liquid crystal display often experience stresses due to mounting structures that are attached to the display or due to internal display structures. During operation of a conventional liquid crystal display, the liquid crystal material is sometimes arranged so that light is blocked from escaping from the display. However, in a portion of the display that is under stress, a fraction of that light can sometimes escape from that portion of the display or from a nearby portion of the display. This type of light leakage from a display under stress can create difficulties in, for example, displaying images with dark portions.

It would therefore be desirable to be able to provide improved displays such as displays that exhibit minimized light leakage under stress.

SUMMARY

An electronic device is provided with a display such as a liquid crystal display mounted in an electronic device housing. The display includes a display module having an array of display pixels. The array of display pixels includes display pixels in a central region of the display and display pixels in a border region of the display.

A backlight unit is used to provide backlight illumination to the display module. The backlight unit may include a light guide plate and a light source that emits light into an edge of the light guide plate. The light guide plate is used to distribute the light uniformly across the display.

The display includes display control circuitry and light leakage reduction structures. The display control circuitry is configured to drive each display pixel based on whether or not the display pixel is in the central region or the border region of the display. The display control circuitry may also be configured to drive each display pixel based on whether or not an input gray value for the display pixel is above or below a threshold gray value.

Display pixels in the central region are driven according to a first gray level mapping curve. Display pixels in the border region are driven according to a second gray level mapping curve that is different from the first gray level mapping curve. The first and second gray level mapping curves are used to map digital input gray levels to pixel transmissivity levels.

To reduce light leakage from the display, the second gray level mapping curve maps input gray levels below a light leakage threshold level to higher pixel transmissivity levels than the first gray level mapping curve. Higher transmissivity levels may in turn lead to minimized light leakage.

To ensure that display pixels in the border region display light having a desired intensity, light leakage reduction structures are configured to reduce the intensity of backlight received by the display pixels in the border region relative to the intensity of backlight received by display pixels in the central region. The increase in pixel transmissivity and the reduction in backlight intensity are coordinated such that the display pixel displays light at the desired intensity.

The light leakage reduction structures may be switchable or non-switchable. In one suitable embodiment, the light leakage reduction structures are light-scattering features in the light guide plate. The light-scattering features have a gradient density such that less light is scattered upwards towards pixels in the border region than towards pixels in the central region.

In another suitable embodiment, the light leakage reduction structures include a shutter module interposed between the backlight unit and the array of display pixels. The shutter module includes one or more local dimming elements formed from a polymer-dispersed liquid crystal layer. The local dimming element may be activated by adjusting an electric field across the polymer-dispersed liquid crystal layer such that the polymer-dispersed liquid crystal layer is only partially transmissive. The local dimming element may be deactivated by adjusting the electric field across the polymer-dispersed liquid crystal layer such that the polymer-dispersed liquid crystal layer is fully transmissive.

Further features, their nature and various advantages will be more apparent from the accompanying drawings and the following detailed description of the preferred embodiments.

DETAILED DESCRIPTION

Displays are widely used in electronic devices. For example, displays may be used in computer monitors, laptop computers, media players, cellular telephones, televisions, and other equipment. Displays may be based on plasma technology, organic-light-emitting-diode technology, liquid crystal structures, or other suitable display structures.

Liquid crystal displays are popular because they can exhibit low power consumption and good image quality. Liquid crystal display structures are sometimes described herein as an example. In order to minimize light leakage from the display when some or all of the display is under stress (e.g., when some or all of the display is experiencing an internal or external pressure or force) a liquid crystal display may be provided with one or more light leakage reduction structures. The light leakage reduction structures may be used in combination with display control circuitry to reduce light leakage from the display.

Illustrative electronic devices that have displays with light leakage reduction structures and display control circuitry that may be used to minimize light leakage from the display are shown in FIGS. 1, 2, 3, and 4.

Figure 1:
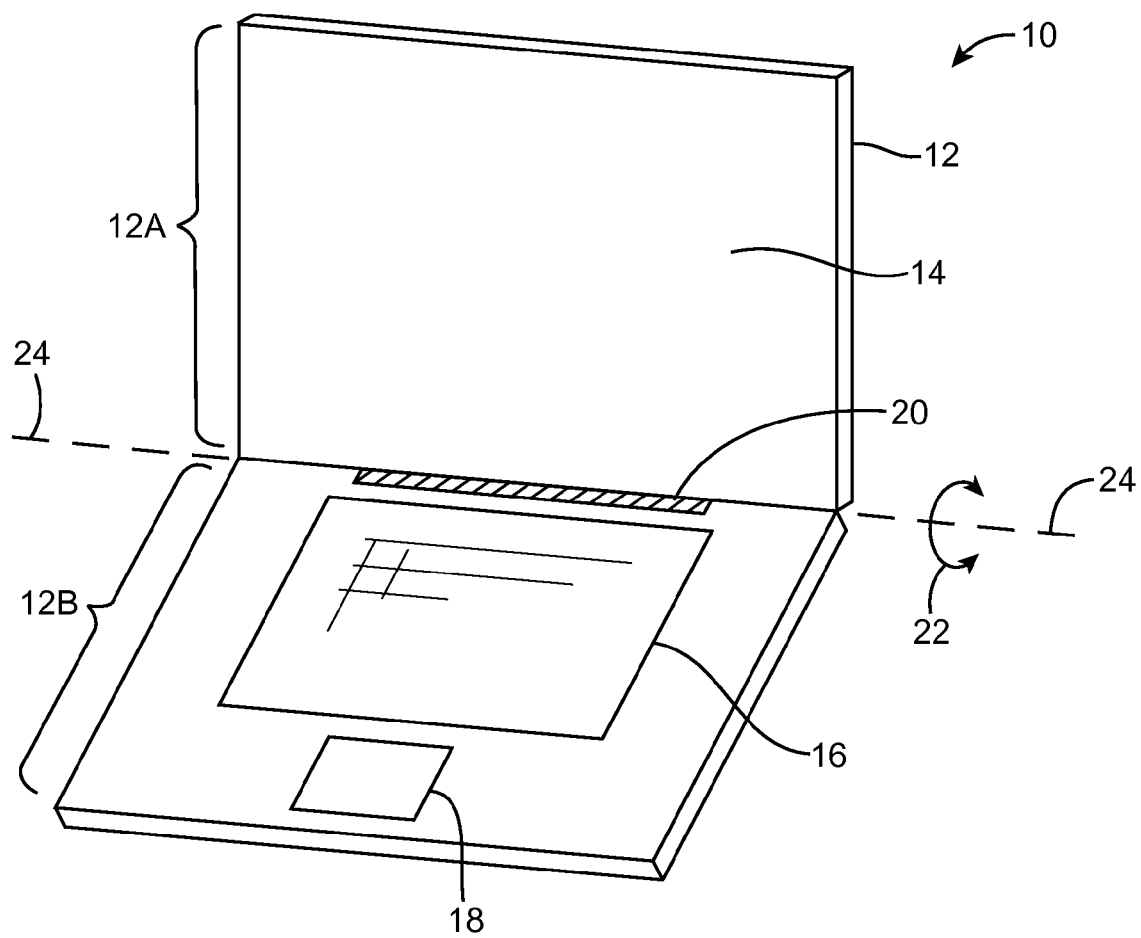
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 to allow upper housing 12A to rotate in directions 22 about rotational axis 24 relative to lower housing 12B. Display 14 is mounted in upper housing 12A. Upper housing 12A, which may sometimes referred to as a display housing or lid, is placed in a closed position by rotating upper housing 12A towards lower housing 12B about rotational axis 24.

Figure 2:
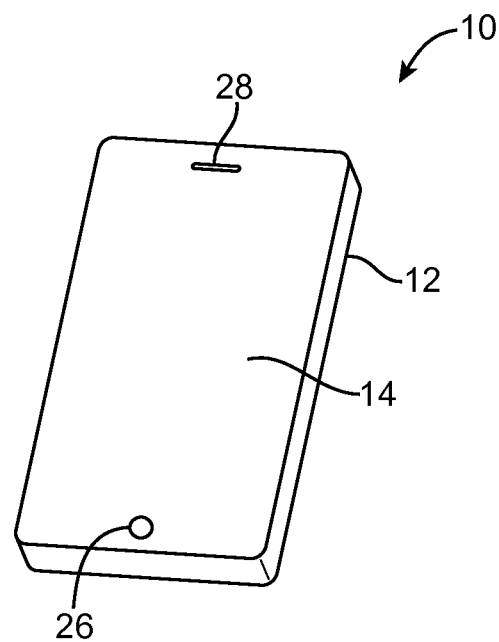
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
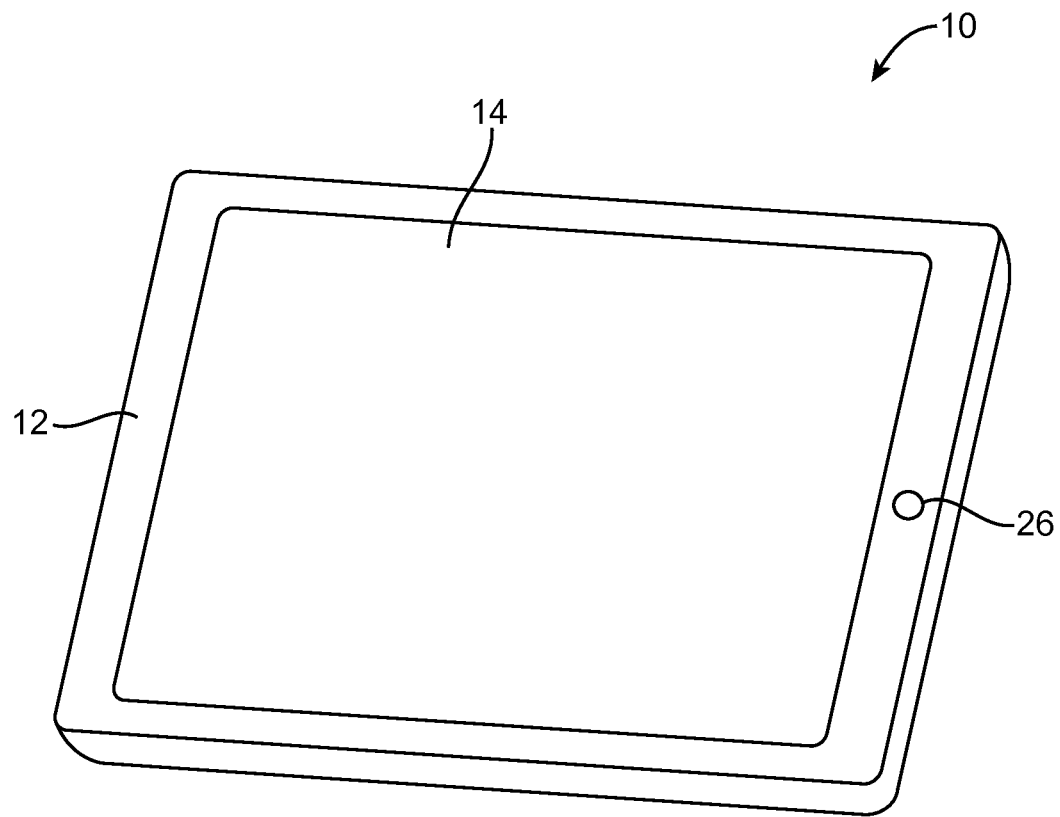
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
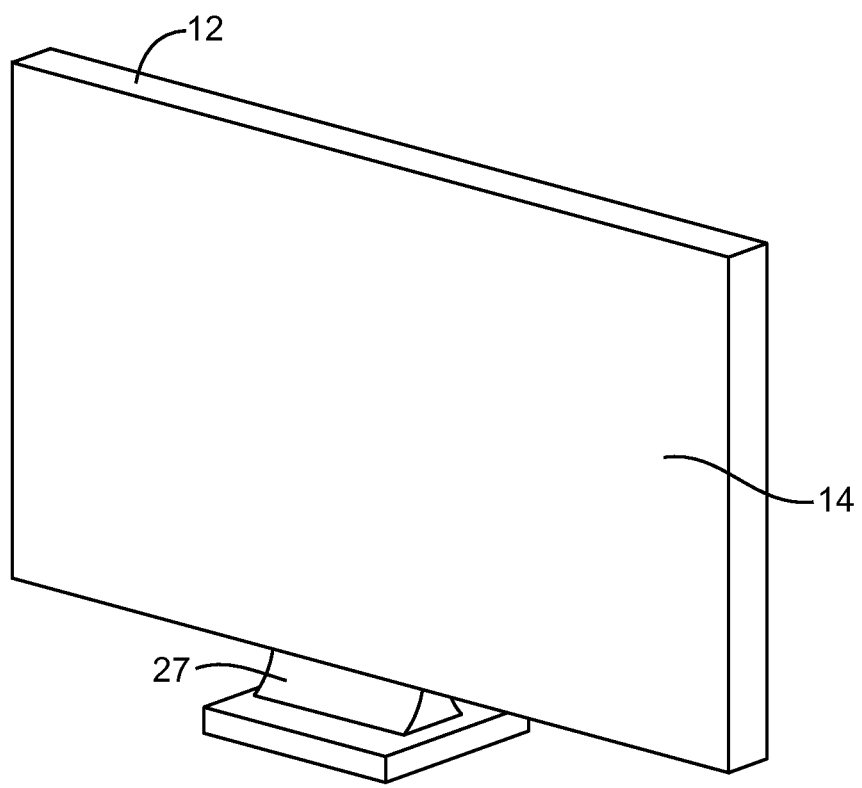
FIG. 4 is a perspective view of an illustrative electronic device such as a computer display with display structures in accordance with an embodiment.

FIG. 4 shows an illustrative configuration for electronic device 10 in which device 10 is a computer display or a computer that has been integrated into a computer display. With this type of arrangement, housing 12 for device 10 is mounted on a support structure such as stand 27. Display 14 is mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, is formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch-sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
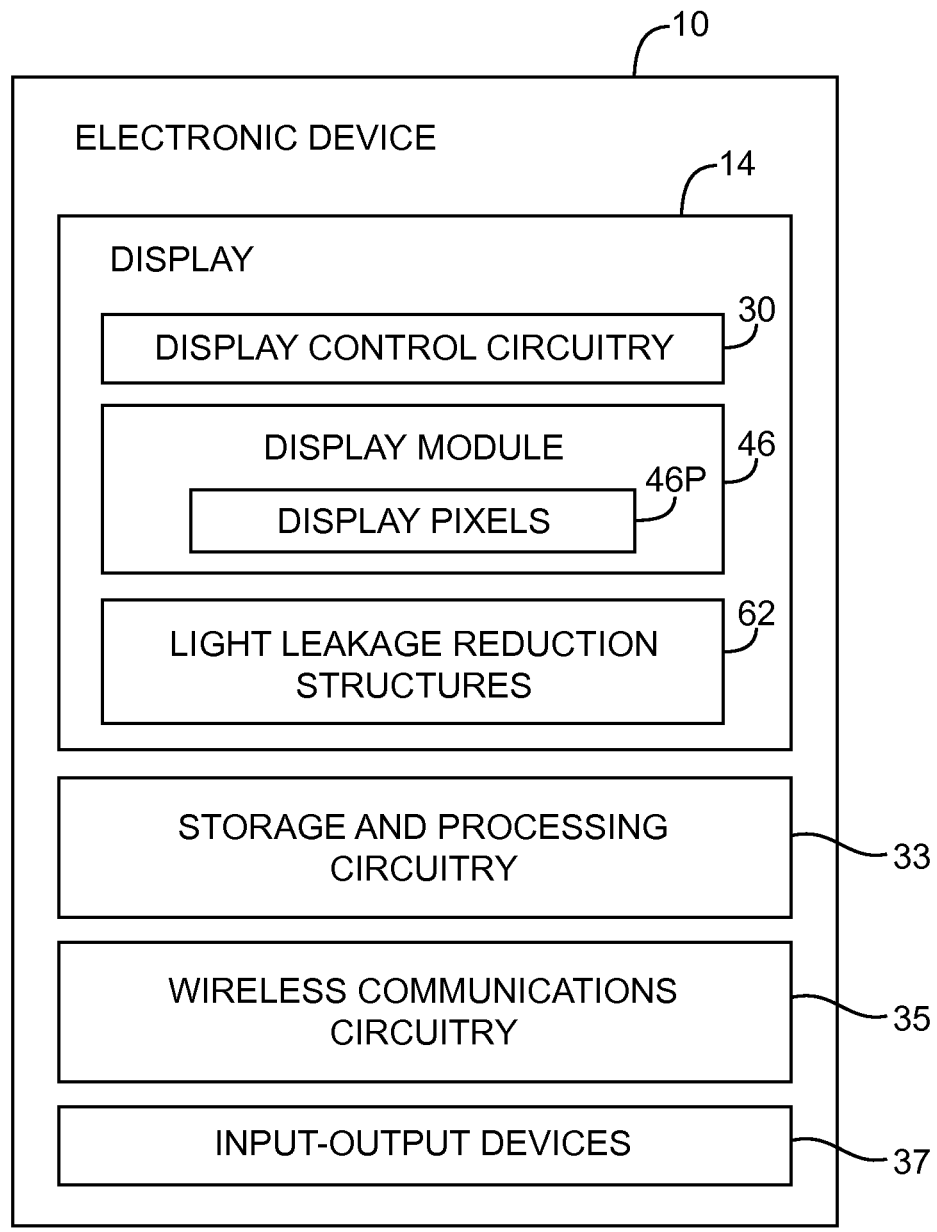
FIG. 5 is a schematic diagram of an illustrative electronic device of the type shown in FIGS. 1, 2, 3, and 4 in accordance with an embodiment.

A schematic diagram of electronic device 10 is shown in FIG. 5. As shown in FIG. 5, electronic device 10 includes a display such as display 14. Display 14 includes display module 46 having an array of display pixels 46P, light leakage reduction structures 62, and display control circuitry 30 for operating display module 46 and, in some arrangements, for operating light leakage reduction structures 62.

Display pixels 46P may be formed from reflective components, liquid crystal display (LCD) components, organic light-emitting diode (OLED) components, or other suitable display pixel structures. Arrangements in which display pixels 46P are liquid crystal display pixels are sometimes described herein as an illustrative example. To provide display 14 with the ability to display color images, display pixels 46P may include color filter elements. Each color filter element may be used to impart color to the light associated with a respective display pixel 46P in pixel array of display 14.

Light leakage reduction structures 62 and display control circuitry 30 are used to help control the amount of light that is emitted by display 14. For example, display control circuitry 30 may be used to increase the voltage applied to pixels in light leakage regions (thereby increasing the transmissivity of those pixels), while, at the same time, light leakage reduction structures may be used to reduce the amount of backlight that reaches those pixels. The reduced backlight intensity and corresponding shift in pixel voltage may help suppress or eliminate light leakage from display 14.

Light leakage reduction structures 62 may be switchable (i.e., dynamic) or non-switchable (i.e., static). In configurations where structures 62 are dynamic, structures 62 may include an array, ring, or other arrangement of local dimming elements. Each local dimming element may be used to control the amount of backlight that reaches overlapping display pixels 46P from a backlight unit. For example, when it is desired to display black in a selected region of display 14, light leakage reduction structures 62 that overlap that region are manipulated to block light from reaching display pixels 46P in the selected region.

In configurations where structures 62 are static, structures 62 may be configured to reduce the amount of backlight that reaches display pixels 46P in one or more regions of display 14.

Display control circuitry 30 may include a graphics controller (sometimes referred to as a video card or video adapter) that may be used to provide video data and control signals to display 14. Video data may include text, graphics, images, moving video content, or other content to be presented on display 14.

Display control circuitry 30 may also include display driver circuitry. Display driver circuitry in circuitry 30 may be implemented using one or more integrated circuits (ICs) and is sometimes be referred to as a driver IC, display driver integrated circuit, or display driver. If desired, the display driver integrated circuit may be mounted on an edge of a thin-film-transistor substrate layer in display 14 (as an example). Display control circuitry 30 may include timing controller (TCON) circuitry such as a TCON integrated circuit. The timing controller may be used to supply pixel signals to display pixels 46P. In configurations where light leakage reduction structures 62 are switchable, the timing controller used to supply pixel signals to display pixels 46P may also be used to supply signals to light leakage reduction structures 62. If desired, a separate timing controller may supply signals to light leakage reduction structures.

Display control circuitry 30 may supply pixel signals to each display pixel 46P based on whether or not that pixel is in a light leakage region and/or based on whether or not the input pixel value is within a light leakage range of pixel values. For example, display control circuitry 30 may use a lookup table to adjust the transmissivity of a pixel when the input pixel value is within a light leakage range of pixel values and/or when a pixel is in a light leakage region of the display.

Display control circuitry 30 may be coupled to additional circuitry in device 10 such as storage and processing circuitry 33. Storage and processing circuitry 33 in device 10 may include microprocessors, microcontrollers, digital signal processor integrated circuits, application-specific integrated circuits, and other processing circuitry. Volatile and non-volatile memory circuits such as random-access memory, read-only memory, hard disk drive storage, solid state drives, and other storage circuitry may also be included in circuitry 33. Display calibration information may be stored using circuitry 33 or may be stored using display control circuitry 30 or other circuitry associated with display 14.

Circuitry 33 may use wireless communications circuitry 35 and/or input-output devices 37 to obtain user input and to provide output to a user. Input-output devices 37 may include speakers, microphones, sensors, buttons, keyboards, displays, touch sensors, and other components for receiving input and supplying output. Wireless communications circuitry 35 may include wireless local area network transceiver circuitry, cellular telephone network transceiver circuitry, and other components for wireless communication.

Figure 6:
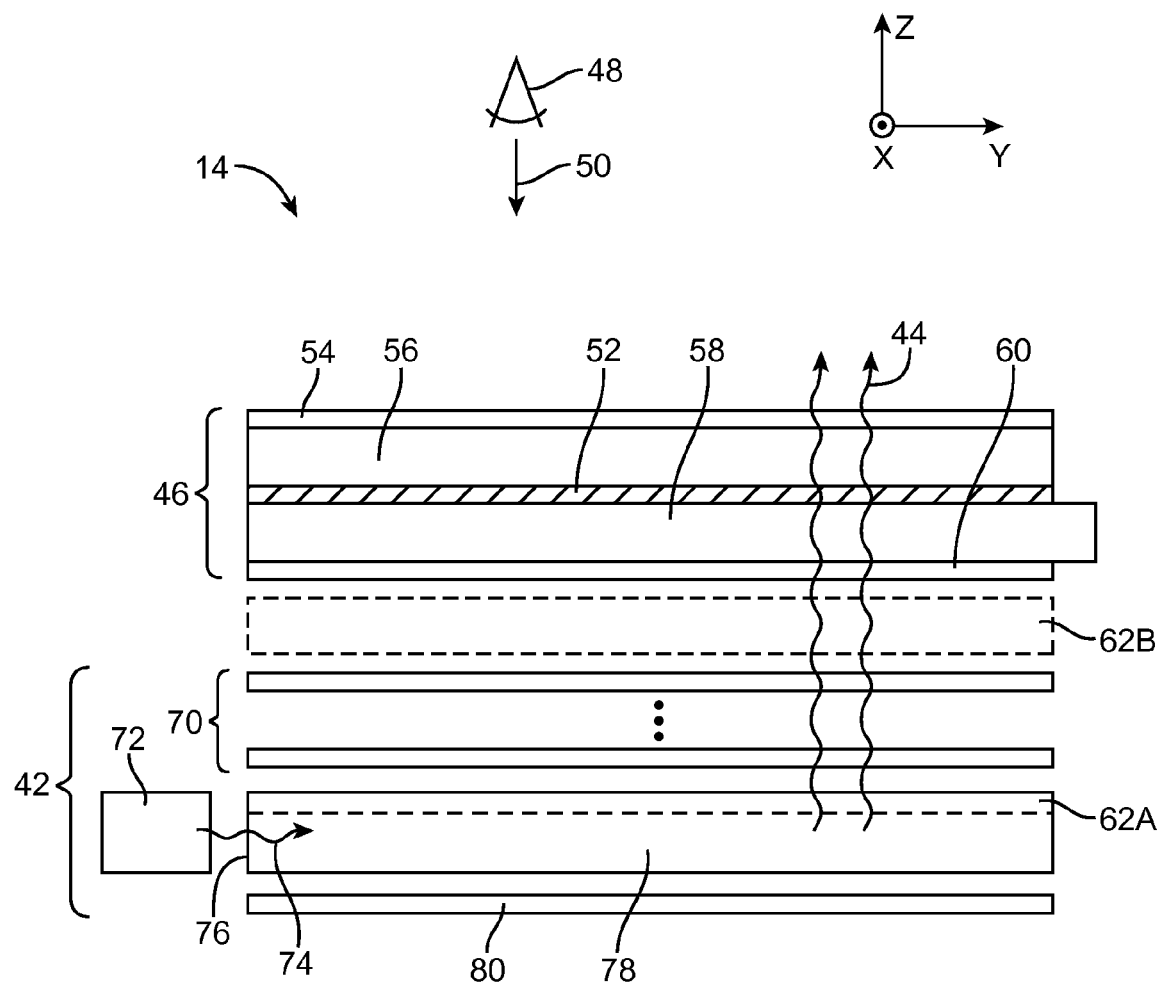
FIG. 6 a cross-sectional side view of an illustrative display of the type that may be used in devices of the types shown in FIGS. 1, 2, 3, and 4 in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 6. As shown in FIG. 6, display 14 includes backlight structures such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 illuminates images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 form a liquid crystal display or may be used in forming displays of other types.

In a configuration in which display layers 46 are used in forming a liquid crystal display, display layers 46 include a liquid crystal layer such as liquid crystal layer 52. Liquid crystal layer 52 is sandwiched between display layers such as display layers 56 and 58. Layers 56 and 58 are interposed between lower polarizer layer 60 and upper polarizer layer 54. Display layers 46 are sometimes collectively referred to herein as "display module" 46.

Layers 56 and 58 are formed from transparent substrate layers such as clear layers of glass or plastic. Layers 56 and 58 are layers such as a color filter layer (e.g., a color filter layer substrate such as a layer of glass having a layer of color filter elements such as red, green, and blue color filter elements arranged in an array) and/or a thin-film transistor layer (e.g., a thin-film transistor substrate such as a glass layer coated with a layer of thin-film transistor circuitry). Conductive traces, color filter elements, transistors, and other circuits and structures are formed on the substrates of layers 56 and 58 (e.g., to form a color filter layer and/or a thin-film transistor layer). Touch sensor electrodes may also be incorporated into layers such as layers 56 and 58 and/or touch sensor electrodes may be formed on other substrates.

With one illustrative configuration, layer 58 is a thin-film transistor layer that includes an array of thin-film transistors and associated electrodes (display pixel electrodes) for applying electric fields to liquid crystal layer 52 and thereby displaying images on display 14. Layer 56 is a color filter layer that includes an array of color filter elements for providing display 14 with the ability to display color images. If desired, layer 58 may be a color filter layer and layer 56 may be a thin-film transistor layer.

Display module 46 is illuminated with backlight 44 provided by backlight structures 42. In the example of FIG. 6, backlight structures 42 include a light guide plate such as light guide plate 78. Light guide plate 78 is formed from a transparent material such as clear glass or plastic. During operation of backlight structures 42, a light source such as light source 72 generates light 74. Light source 72 may be, for example, an array of light-emitting diodes.

Light 74 from one or more light sources such as light source 72 is coupled into one or more corresponding edge surfaces such as edge surface 76 of light guide plate 78 and is distributed in dimensions X and Y throughout light guide plate 78 due to the principal of total internal reflection. Light guide plate 78 includes light-scattering features such as pits or bumps. The light-scattering features are located on an upper surface and/or on an opposing lower surface of light guide plate 78.

Light 74 that scatters upwards in direction Z from light guide plate 78 serves as backlight 44 for display 14. Light 74 that scatters downwards is reflected back in the upwards direction by reflector 80. Reflector 80 is formed from a reflective material such as a layer of white plastic or other shiny materials. The use of a reflector in backlight 42 is, however, merely illustrative and may not be needed in some configurations.

The configuration of FIG. 6 in which backlight structures 42 form part of an edge-lit display is merely illustrative. If desired, other suitable types of backlights may be used in display 14. For example, backlight structures 42 may include an array (e.g., a rectangular array) of light-emitting diodes or organic light-emitting diodes formed behind display module 46 or may include other light sources such as a cold-cathode florescent lamp. Arrangements in which display 14 is an edge-lit display (e.g., in which a light source emits light into the edge of a light guide plate which in turn distributes the light across the display panel) are sometimes described herein as an example.

To enhance backlight performance for backlight structures 42, backlight structures 42 optionally include optical films 70. Optical films 70 include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 overlap the other structures in backlight unit 42 such as light guide plate 78 and reflector 80. For example, if light guide plate 78 has a rectangular footprint in the X-Y plane of FIG. 6, optical films 70 and reflector 80 preferably have a matching rectangular footprint. The configuration of FIG. 6 in which optical films 70 are located directly above light guide plate 78 is merely illustrative. If desired, optical films 70 may be located elsewhere in display 14.

In some configurations, light leakage reduction structures 62 are integrated into backlight structures 42. For example, as shown in FIG. 6, light leakage reduction structures 62A may be integrated into light guide plate 78. Structures 62A may, for example, be light-scattering features (e.g., bumps, pits, roughened surfaces, or other suitable light-scattering features) in light guide plate 78. Light leakage reduction structures 62A may be configured to reduce the amount of light that is scattered upwards towards display pixels in light leakage regions (e.g., display pixels in a border region of the display) relative to the amount of light that is scattered upwards towards display pixels that are not in light leakage regions (e.g., display pixels in a central region of the display).

For example, edge pixels that tend to exhibit greater light leakage than center pixels may receive a reduced amount of backlight 44 from light guide plate 78 compared to the amount of backlight 44 received by center pixels. This may be achieved by, for example, configuring light-scattering features 62A (e.g., configuring the density, size, shape, location, and/or type of light-scattering features 62A) in light guide plate 78 to scatter more light upwards (in direction Z) from the central portion of the upper surface of light guide plate 78 than from the peripheral portion of the upper surface of light guide plate 78.

In other configurations, light leakage reduction structures 62 are formed from a shutter module that controls the transmission of backlight 44 from backlight structures 42. For example, as shown in FIG. 6, light leakage reduction structures 62B (sometimes referred to as shutter module 62B) may be interposed between backlight structures 42 and display module 46. Shutter module 62B may include one or more local dimming elements. Each local dimming element may be configured to control the amount of backlight 44 that reaches a given region of display 14.

Local dimming elements in shutter module 62B can have different shapes and sizes or local dimming elements can all have the same shape and size. In one suitable embodiment, local dimming elements in shutter module 62B are arranged in an array of rows and columns. In another suitable embodiment, shutter module 62B includes a single dimming element that forms a rectangular ring that is aligned with the display pixels in the border region of the display. Local dimming elements in shutter module 62B can have the same resolution as display pixels 46P (FIG. 5) in display module 46 or local dimming elements can have a resolution that is greater or less than the resolution of display pixels 46P in display module 46.

Shutter module 62B may be formed from liquid crystal structures, polymer-dispersed liquid crystal structures, reflective display structures, electrowetting display structures, electrophoretic display structures, microelectromechanical systems-based shutter elements, photovoltaic materials, and/or other suitable light-controlling structures. Each local dimming element in shutter module 62B is configured to control light transmission independently of the other local dimming elements in shutter module 62B. Local dimming elements can be controlled using data line signals on data lines and gate line signals on gate lines.

Shutter module 62B may be configured to reduce the amount of backlight 44 that reaches display pixels 46P in light leakage regions of display 14. For example, edge pixels that are more prone to exhibit light leakage than center pixels may receive a reduced amount of backlight 44 from light guide plate 78 compared to the amount of backlight 44 received by center pixels. This may be achieved by, for example, using shutter module 62B to block some or all of backlight 44 from reaching edge display pixels, while allowing all of backlight 44 to reach center pixels.

Shutter module 62B may be assembled with other display structures in display 14 in any suitable fashion. In one suitable embodiment, shutter module 62B is laminated to display module 46 using an adhesive such as optically clear adhesive. In another suitable embodiment, an air gap may separate display module 46 from shutter module 62B. If desired, display module 46 and shutter module 62B may be manufactured as a single panel.

During operation of display 14, control circuitry in device 10 (e.g., circuitry 33 of FIG. 5) is used to generate information to be displayed on display 14 (e.g., display data). The information to be displayed is conveyed from the control circuitry to display control circuitry 30 (e.g., a display driver integrated circuit that is mounted on a ledge of thin-film transistor layer 58 or elsewhere in device 10). If desired, a flexible printed circuit cable can be used in routing signals between the control circuitry and thin-film-transistor layer 58.

If desired, a single display control circuit (e.g., a timing controller (ICON) integrated circuit in circuitry 30 of FIG. 5) may be used to control both display module 46 and shutter module 62B. With this type of configuration, the timing controller supplies data line and gate line signals to both display module 46 and shutter structures 62B. The use of a single timing controller integrated circuit to control both display module 46 and shutter module 62B is merely illustrative. If desired, a first timing controller integrated circuit can be used to control display module 46 and a second timing controller integrated circuit can be used to control shutter module 62B.

Figure 7:
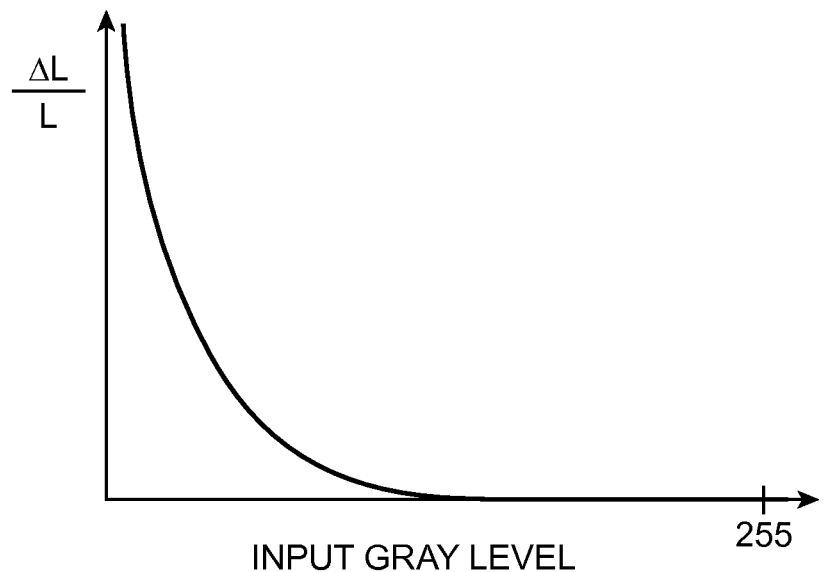
FIG. 7 is a graph showing how light leakage in a conventional display varies as a function of input gray level.

FIG. 7 is a graph illustrating how ΔL/L in a conventional display varies as a function of the input gray level, where ΔL corresponds to luminance error (sometimes referred to as light leakage), and L corresponds to luminance. As the input gray level increases, the measured luminance increases and the error in luminance decreases. Beyond a threshold luminance, the error in luminance becomes insignificant (e.g., light leakage becomes unnoticeable to a viewer). In other words, light leakage in conventional displays tends to be observable for dark, low-luminance colors such as black and dark grays (e.g., input gray levels below 60). The input gray level at which luminance error becomes insignificant is sometimes referred to herein as the light leakage threshold gray level (LL).

Figure 8:
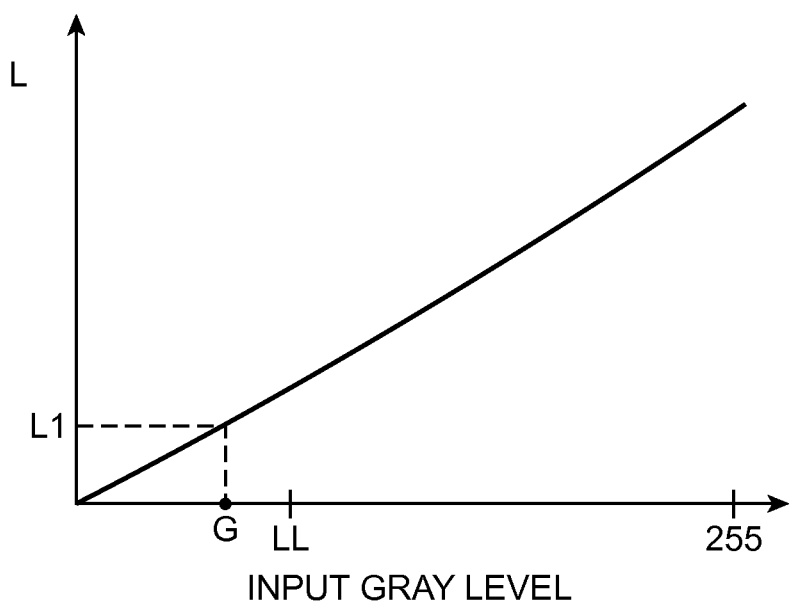
FIG. 8 is a graph of luminance as a function of input gray value showing how a display may have a light leakage threshold value in accordance with an embodiment.

Light leakage may therefore be minimized by increasing pixel transmissivity for input gray levels below the light leakage threshold level. Increasing pixel transmissivity for low gray levels my reduce or eliminate light leakage. For example, as shown in FIG. 8, an input gray level for a pixel such as input gray level G may fall below light leakage threshold LL. In order to minimize light leakage from the pixel while still displaying light with the desired luminance L1, the transmissivity of the pixel for the input gray level may be increased while, at the same time, light leakage reduction structures 62 (FIG. 5) may decrease the intensity of backlight received by the pixel by a corresponding amount. Pixels that receive input gray levels above the light leakage threshold LL may exhibit minimal light leakage.

If desired, the light leakage threshold LL may be determined on a per-device basis. For example, display performance information such as luminance information and luminance error information may be gathered from display 14 during manufacturing and may be used to determine the light leakage threshold gray value LL for display 14. The light leakage threshold gray value may, for example, be a value between 40 and 80, between 50 and 70, between 55 and 65, less than 60, greater than 60, etc.

It should be appreciated that FIGS. 7 and 8 are examples in which each color channel has eight bits dedicated to it. Alternative embodiments may employ greater or fewer bits per color channel. For example, each color may, if desired, have six bits dedicated to it. With this type of configuration, gray levels may range from 0 to 64. Arrangements in which each color channel has eight bits dedicated to it are sometimes described herein as an example.

Some regions of a display may be more prone to light leakage than other regions of a display. For example, stress-induced birefringence may cause light leakage at edges and corners of a display, whereas the central portion of a display may exhibit little to no light leakage. It may therefore be desirable to adjust the gray level mapping function used to drive pixels in light leakage regions where light leakage tends to be an issue. The gray level mapping function used to drive pixels that are located in regions of the display that do not tend to exhibit light leakage need not be adjusted.

Figure 9:
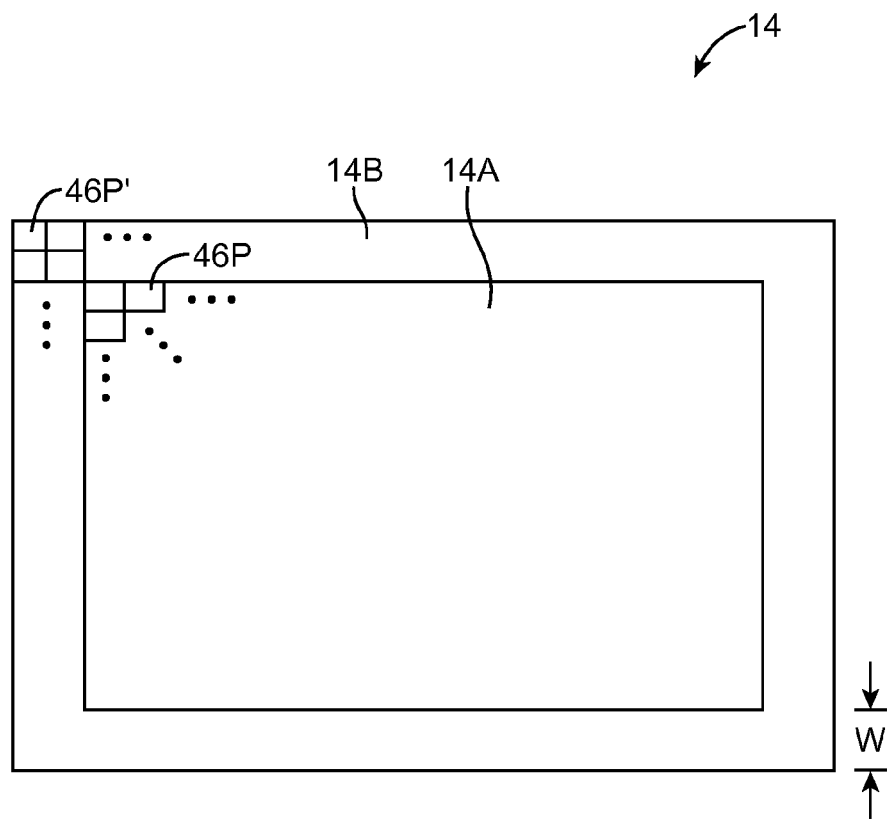
FIG. 9 is a top view of display 14 showing how a pixel array may include display pixels in a central region surrounded by display pixels in a border region in accordance with an embodiment.

FIG. 9 is a top view of display 14 showing how pixels 46P may be located in region 14A of display 14 and how pixels 46P' may be located in region 14B of display 14. Region 14A may be a region of display 14 that is not prone to light leakage. Region 14B may be a region of display 14 that, if care is not taken, may be prone to light leakage when input gray levels are below the light leakage threshold and when the gray level mapping function is not adjusted. Pixels 46P in region 14A may therefore be driven according to a first gray level mapping function, whereas pixels 46P' in region 14B may be driven according to a second (modified) gray level mapping function that is different from the first gray level mapping function. As used herein, "gray level mapping function" refers to a function that maps digital input gray levels to pixel transmissivity levels.

The phrase "light leakage region" may be used herein to describe a region of display 14 that can, if care is not taken, exhibit light leakage when pixels in that region receive input gray levels below the light leakage threshold gray level LL and when the gray level mapping function is not adjusted to reduce light leakage. In the illustrative example of FIG. 9, light leakage region 14B forms a rectangular ring around central portion 14A of display 14. Region 14B may have a width W between 1 cm and 10 cm, between 2 cm and 8 cm, between 3 cm and 5 cm, less than 10 cm, greater than 10 cm, etc.

Light leakage in region 14B may be minimized by increasing the transmissivity of pixels 46P' for input gray levels that are less than the light leakage threshold LL. To achieve the desired gray level output from pixels 46P', the increase in transmissivity of pixels 46P' may be accompanied by a corresponding decrease in backlight intensity received by pixels 46P'. The intensity of backlight received by pixels 46P' may be reduced using light leakage reduction structures 62 (e.g., light leakage reduction structures 62A or light leakage reduction structures 62B of FIG. 6). Pixels 46P' in region 14B may overlap light leakage reduction structures 62 that reduce the intensity of backlight received by pixels 46P'.

The example of FIG. 9 in which light leakage region 14B is a rectangular ring that surrounds central region 14A is merely illustrative. In general, any suitable region of pixels in display 14 may be driven at increased voltages when input gray levels are below a gray level threshold LL while receiving reduced backlight intensity. For example, light leakage region 14B may include one or more top rows and one or more bottom rows of pixels; may include one or more left columns and one or more right columns of pixels; may include pixels in a central portion of the display; may include the entire array of pixels; or may include any other suitable region(s) of pixels. Arrangements in which region 14A is a rectangular central region of display 14 and in which region 14B forms a border that surrounds central region 14A are sometimes described herein as an example.

If desired, light leakage regions of display 14 may be determined during manufacturing on a per-device basis. In one suitable embodiment, a camera may be used to take images of display 14 and to determine the luminance error distribution across the panel. The luminance error information may be used to determine which regions are susceptible to light leakage (such as region 14B of FIG. 9). Display 14 (e.g., display control circuitry 30 and/or light leakage reduction structures 62) may then be configured such that pixels 46P' in the determined light leakage regions receive reduced backlight intensity and corresponding shifts in pixel transmissivity. This is, however, merely illustrative. If desired, light leakage regions 14B may be determined for device 10 without gathering luminance error information from display 14.

Display control circuitry 30 may therefore use a modified gray level mapping function for controlling pixels 46P' in border region 14B relative to the gray level mapping function used to control pixels 46P in central region 14A. A graph showing illustrative gray level mapping functions that may be used in respectively controlling pixels 46P' in border region 14B and pixels 46P in central region 14A is shown in FIG. 10.

Figure 10:
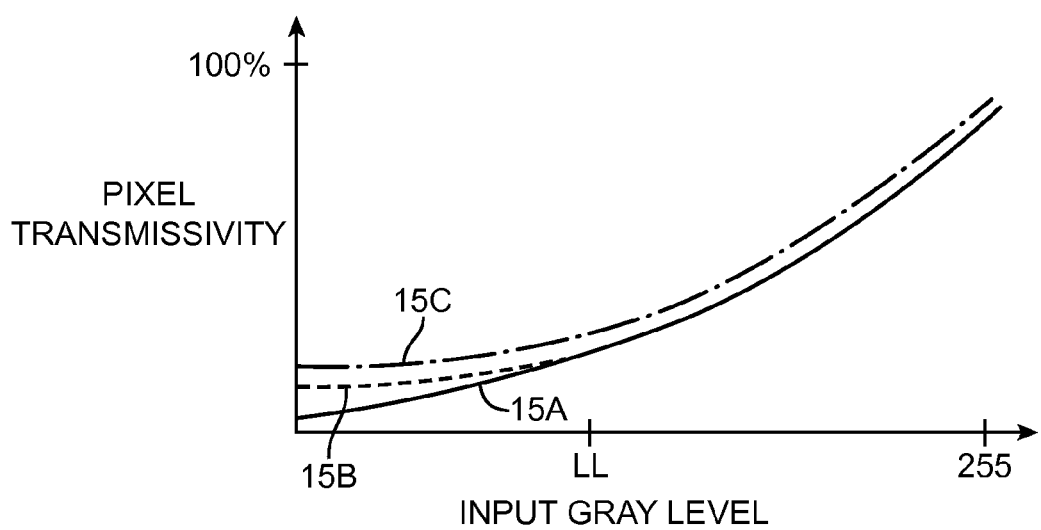
FIG. 10 is a graph showing how display pixels in a border region of a display may be driven according to a different gray level mapping function than display pixels in a central region of the display in accordance with an embodiment.

Gray level mapping function 15A of FIG. 10 is used to determine transmissivity levels of pixels 46P in central region 14A based on digital input gray levels (e.g., digital input gray values received from storage and processing circuitry 33). Modified gray level mapping function 15B is used to determine transmissivity levels of pixels 46P' in border region 14B based on digital input gray levels.

As shown in FIG. 10, pixels 46P' in border region 14A are configured to be more transmissive than pixels 46P in central region 14B when displaying neutral light having an associated input gray level that is below the light leakage threshold LL. The higher transmissivity of pixels 46P' in border region 14B for darker colors such as black and dark gray helps minimize light leakage in display 14.

Display control circuitry 30 may drive pixels 46P in central region 14A according to gray level mapping function 15A and may drive pixels 46P' in border region 14B according to gray level mapping function 15B.

In the example of FIG. 10, modified gray level mapping function 15B differs from gray level mapping function 15A only for input gray levels below the light leakage threshold LL. This type of modified gray level mapping function is suitable for arrangements in which light leakage reduction structures 62 are switchable. For example, for input gray levels at or above the light leakage threshold LL, light leakage reduction structures 62 may be turned off and the pixel transmissivity of pixels 46P' in border region 14B may be the same as pixels 46P in central region 14A.

In arrangements where light leakage reduction structures 62 are not switchable, display control circuitry 30 may use a modified gray level mapping function that is different from gray level mapping function 15A for input gray levels above the light leakage threshold LL. For example, display control circuitry 30 may use modified gray level mapping function 15C to map input gray levels to pixel transmissivity. Because light leakage reduction structures are non-switchable and are configured to reduce the intensity of backlight received by pixels 46P' regardless of input gray level value, the transmissivity of pixels 46P' may be higher than that of pixels 46P for input gray values above the light leakage threshold LL.

Gray level mapping functions 15A, 15B, and 15C may be mathematical expressions computed by a processor or other circuitry in device 10, may be lookup tables stored in memory in device 10, and/or may be implemented using any other suitable circuitry in device 10.

Figure 11:
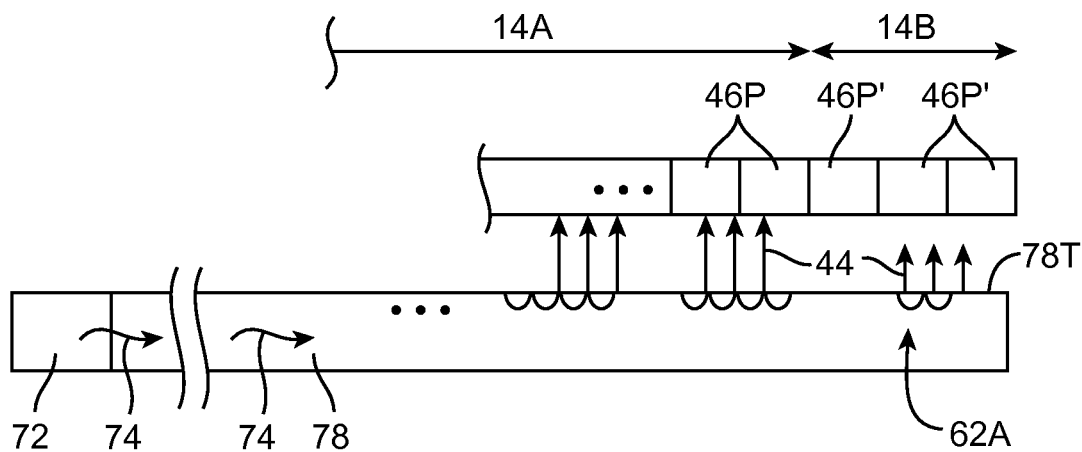
FIG. 11 is a cross-sectional side view of a portion of a display showing how light-scattering features in a light guide plate may be configured to scatter less light towards display pixels in a border region of the display than towards display pixels in a central region of the display in accordance with an embodiment.
Figure 12:
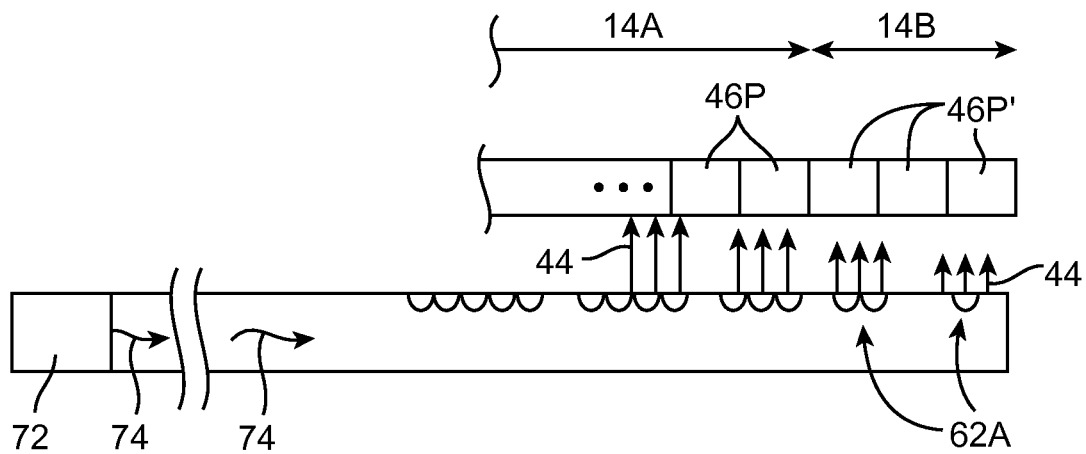
FIG. 12 is a cross-sectional side view of a portion of a display showing how light-scattering features in a light guide plate may have a gradient density along a surface of the light guide plate in accordance with an embodiment.

FIGS. 11 and 12 are cross-sectional side views of a portion of display 14 illustrating how static light leakage reduction structures 62A may be configured to reduce the amount of backlight that reaches display pixels 46P' in light leakage regions of display 14 such as light leakage region 14B.

In the example of FIG. 11, light scatting features 62A (e.g., bumps, pits, roughened surfaces, or other suitable light-scattering features) are used to reduce the amount of light that is emitted from region 14B of top surface 78T of light guide plate 78 relative to the amount of light that is emitted from region 14A of top surface 78T of light guide plate 78. This may be achieved by configuring light-scattering features 62A (e.g., configuring the density, size, shape, location, and/or type of light-scattering features 62A) to ensure that the amount of backlight 44 that is scattered upwards through pixels 46P' is half as much (or any other suitable ratio) as the amount of backlight 44 that is scattered upwards through pixels 46P. For example, in a light guide plate configuration that uses pits to scatter backlight, the pits that are formed on the portion of light guide plate 78 that lies under pixels 46P' may have half the density of pits that are formed on the portion of light guide plate 78 that lies under pixels 46P (or any other suitable ratio).

If desired, light-scattering features 62A may be configured in a gradient fashion such that the transmittance of upper surface 78T of light guide plate 78 decreases gradually from central portion 14A to peripheral portion 14B. This type of configuration is shown in FIG. 12. As shown in FIG. 12, the density of light-scattering features 62A is gradually reduced from a first density under pixels 46P to a second density under pixels 46P'. The gradual decrease in transmittance of top surface 78T ensures that pixels 46P' receive backlight with lower intensity than that received by pixels 46P without producing image artifacts on display 14.

Figure 13:
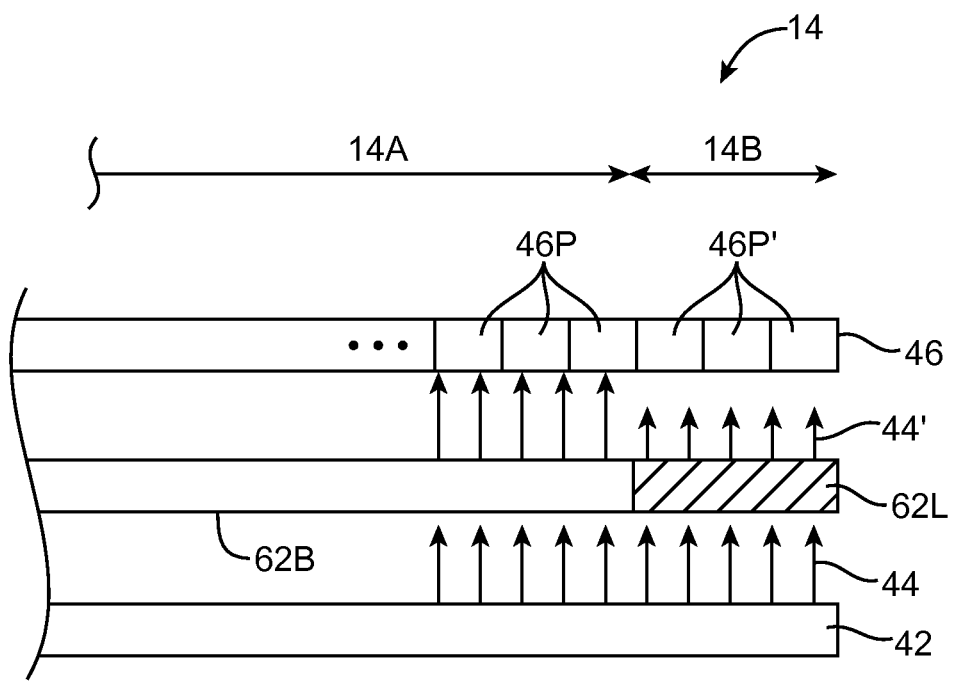
FIG. 13 is a cross-sectional side view of a portion of a display showing how a shutter module having one or more local dimming elements may be interposed between an array of display pixels and a backlight module in accordance with an embodiment of the present invention.

FIG. 13 is a cross-sectional side view of a portion of display 14 illustrating how light leakage reduction structures 62B may be configured to reduce the amount of backlight that reaches display pixels 46P' in light leakage regions of display 14 such as light leakage region 14B.

In the example of FIG. 13, light leakage reduction structures are formed from a shutter module such as shutter module 62B that is interposed between display module 46 and backlight structures 42. Shutter module 62B may have local dimming elements such as local dimming element 62L configured to control the amount of backlight 44 that passes through shutter module 62B. As shown in FIG. 13, local dimming element 62L lies under pixels 46P' in region 14B of display 14, and, when activated, blocks a portion of backlight 44 so that the intensity of backlight 44' received by pixels 46P' is reduced compared to the intensity of backlight received by pixels 46P. If desired, there may be a single contiguous local dimming element under display pixels 46P' in region 14B (e.g., a single contiguous local dimming element having a rectangular ring shape as shown in FIG. 9, or having any other suitable shape that matches the shape of region 14B of pixels 46P') or there may be multiple local dimming elements under pixels 46P' (e.g., one local dimming element under each pixel 46P', one local dimming element under each set of 4 pixels 46P', one local dimming element under each set of 8 pixels 46P', etc.)

Figure 14:
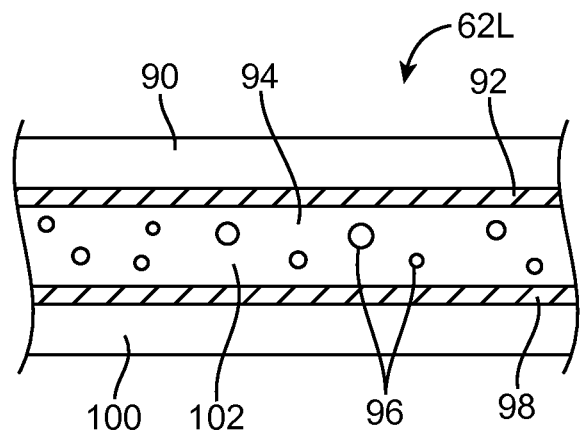
FIG. 14 is a cross-sectional side view of a local dimming element formed from a polymer-dispersed liquid crystal layer in accordance with an embodiment.

In one suitable embodiment, local dimming elements 62L in shutter module 62B are formed from polymer-dispersed liquid crystal structures. This type of configuration is shown in FIG. 14. As shown in FIG. 14, local dimming element 62L includes a polymer-dispersed liquid crystal layer such as polymer-dispersed liquid crystal layer 94. Shutter modules having local dimming elements 62L formed from polymer-dispersed liquid crystal structures are sometimes referred to as polymer-dispersed liquid crystal modules.

Polymer-dispersed liquid crystal layer 94 includes liquid crystal droplets 96 dispersed in solid polymer matrix 102. Layer 94 is interposed between upper substrate 90 and lower substrate 100. Upper and lower substrate layers 90 and 100 are formed from transparent substrate layers such as clear layers of plastic or glass. Upper substrate layer 90 is coated with a conductive material such as transparent conductive material 92 (e.g., a thin coating of indium tin oxide or other transparent conductive material). Lower substrate layer 100 is also coated with a conductive material such as transparent conductive material 98 (e.g., a thin coating of indium tin oxide or other transparent conductive material). Polymer-dispersed liquid crystal layer 94 is sandwiched between conductive coatings 92 and 98 (sometimes referred to herein as upper and lower ITO coatings).

Upper and lower ITO coatings are used for applying electric fields to polymer-dispersed liquid crystal layer 94 and thereby controlling the amount of light transmitted through local dimming element 62L. The transmission of light through layer 94 of local dimming element 62L depends on the amount of scattering that occurs as light strikes layer 94.

The amount of light-scattering in turn depends on the orientation of liquid crystal droplets 96. In the absence of an applied voltage, liquid crystal droplets 96 are dispersed in polymer 102 in a random array. This maximizes the amount of scattering that occurs as light is incident on layer 94 and therefore minimizes the transmission of light through local dimming element 62L. When a voltage is applied across layer 94, the electric field that is produced across layer 94 causes liquid crystal droplets 96 to align with the electric field. This minimizes the amount of scattering that occurs as light is incident on layer 94 and therefore maximizes the transmission of light through local dimming element 62L.

Display control circuitry 30 (e.g., a timing controller) that controls display module 46 can also be used in adjusting the electric field across layer 94 in local dimming element 62L, thereby selectively increasing or decreasing the intensity of backlight received by pixels in display 14. For example, display control circuitry 30 may activate shutter module 62B by adjusting the electric field across layer 94 such that a portion of backlight 44 incident upon dimming element 62L is blocked, thereby reducing the amount of backlight received by overlapping pixels 46P' in region 14B.

Using a switchable light leakage reduction structure such as shutter module 62B of FIGS. 12 and 13 may allow display 14 to retain a high dynamic range in light leakage region 14B. For example, when input gray levels for pixels 46P' are below the light leakage threshold LL, the transmissivity of the pixel may be increased and display control circuitry 30 may adjust shutter module 62B such that local dimming element 62L reduces the intensity of backlight received by pixels 46P' by a corresponding amount (e.g., an amount corresponding to the increase in transmissivity). On the other hand, when input gray levels to pixels 46P' are at or above the light leakage threshold LL, the pixel transmissivity need not be modified and display control circuitry 30 may adjust shutter module 62B such that local dimming element 62L is fully transmissive (e.g., display control circuitry 30 may deactivate local dimming element 62L). This type of configuration ensures that pixels 46P' are able to accurately display high gray levels (e.g., gray levels at or above the light leakage threshold LL) with the desired luminance.

Figure 15:
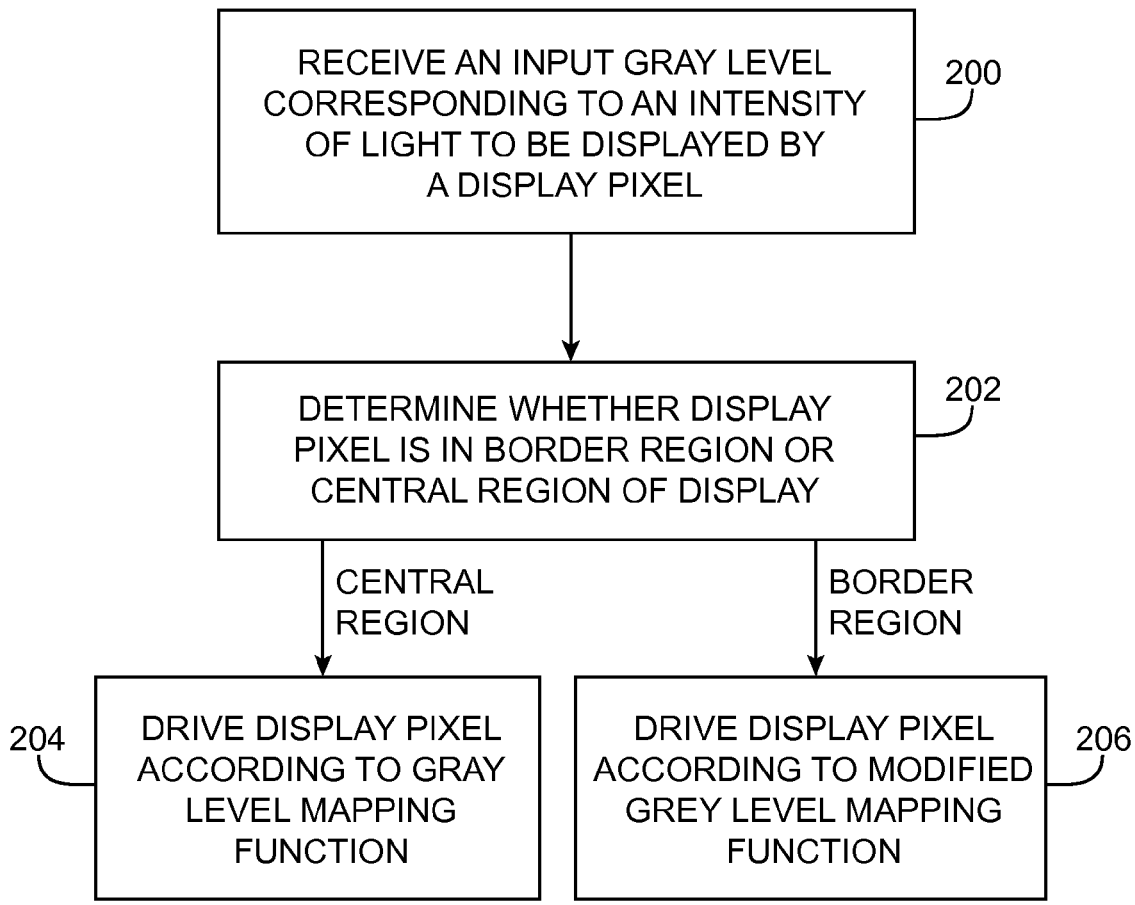
FIG. 15 is a flow chart of illustrative steps involved in operating a display having static light leakage reduction structures in accordance with an embodiment.

FIG. 15 is a flow chart of illustrative steps involved in operating a display such as display 14 using static (e.g., non-switchable) light leakage reduction structures such as light leakage reduction structures 62A of FIGS. 11 and 12.

At step 200, display control circuitry 30 may receive an input gray value corresponding to an intensity of light to be displayed by a given pixel in display 14.

At step 202, display control circuitry 30 may determine whether the display pixel is in a light leakage region of display 14 such as border region 14B of FIG. 9. If it is determined that the pixel is not in a light leakage region of display 14, processing proceeds to step 204.

At step 204, display control circuitry 30 may drive the display pixel according to an unmodified gray level mapping function such as gray level mapping function 15A of FIG. 10. Because the pixel is not within light leakage region 14B (i.e., because the pixel is within central region 14A and does not overlap low-density light scatting features 62A in light guide plate 78), the backlight received by the pixel has an intensity such that the output gray level displayed by the pixel corresponds to the input gray level.

If it is determined during step 202 that the pixel is within a light leakage region such as light leakage region 14B, processing proceeds to step 206.

At step 206, display control circuitry 30 may drive the display pixel according to a modified gray level mapping function such as modified gray level mapping function 15C of FIG. 9. Because the pixel is within border region 14B, low-density light-scattering features 62A in light guide plate 78 ensure that the backlight received by the pixel has a reduced intensity that corresponds to the increased pixel transmissivity such that the output gray level corresponds to the original input gray level.

Figure 16:
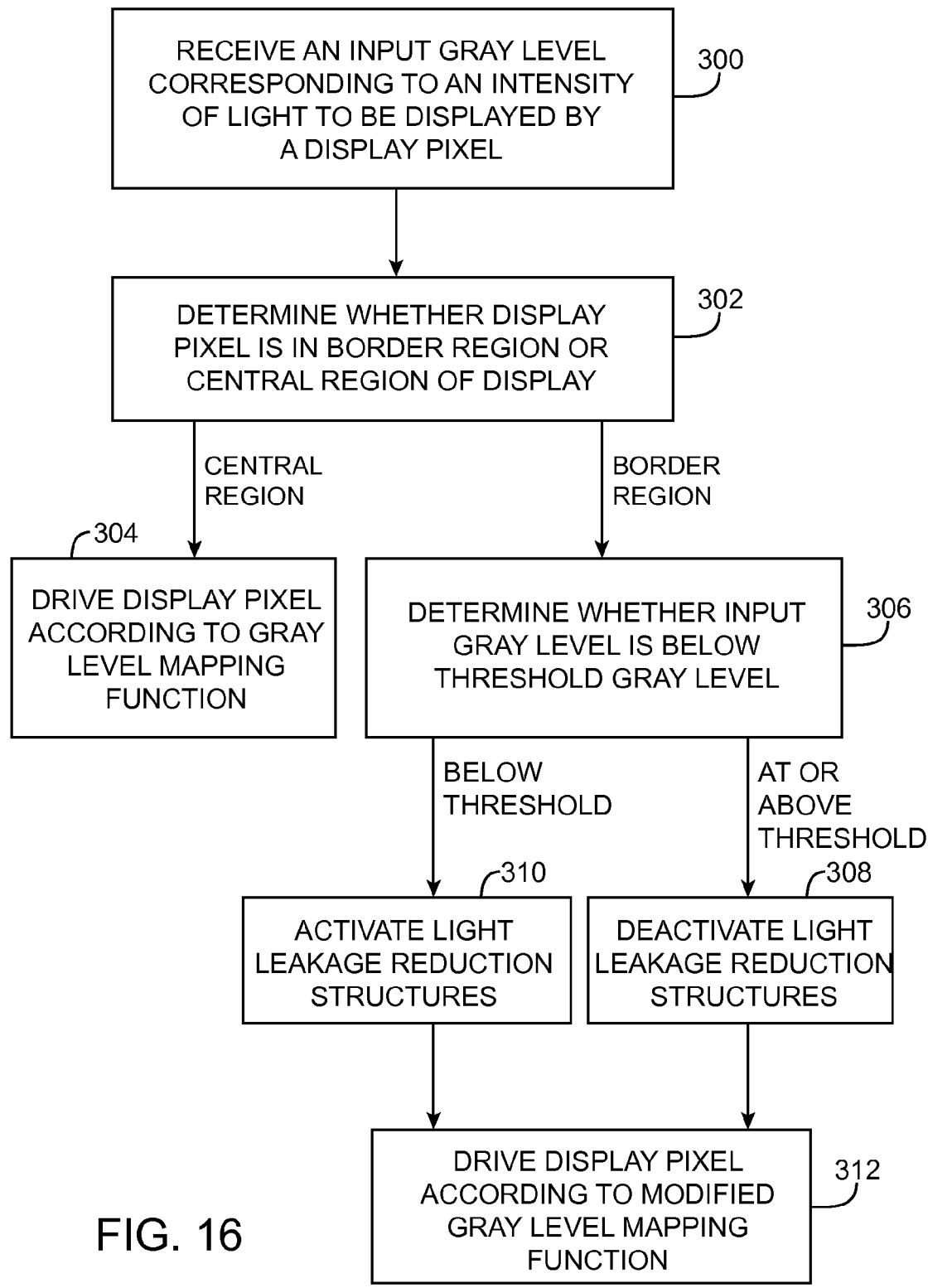
FIG. 16 is a flow chart of illustrative steps involved in operating a display having dynamic light leakage reduction structures in accordance with an embodiment.

FIG. 16 is a flow chart of illustrative steps involved in operating a display such as display 14 using dynamic (e.g., switchable) light leakage reduction structures such as light leakage reduction structures 62B of FIGS. 13 and 14.

At step 300, display control circuitry 30 may receive an input gray value corresponding to an intensity of light to be displayed by a given pixel in display 14.

At step 302, display control circuitry 30 may determine whether the display pixel is in a light leakage region of display 14 such as border region 14B of FIG. 9. If it is determined that the pixel is not in a light leakage region of display 14, processing proceeds to step 304.

At step 304, display control circuitry 30 may drive the display pixel according to an unmodified gray level mapping function such as gray level mapping function 15A of FIG. 10. Because the pixel is not within light leakage region 14B (i.e., because the pixel is within central region 14A and does not overlap local dimming element 62L), the backlight received by the pixel has an intensity such that the output gray level displayed by the pixel corresponds to the input gray level.

If it is determined during step 302 that the pixel is within a light leakage region such as border region 14B, processing proceeds to step 306.

At step 306, display control circuitry 30 may determine whether the input gray level is below a threshold gray level (e.g., light leakage threshold gray level LL of FIG. 10). If it is determined that the input gray level is equal to or greater than the light leakage threshold gray level LL, processing proceeds to step 308.

At step 308, display control circuitry 30 may deactivate light leakage reduction structures 62B such that the local dimming element 62L under the display pixel is fully transmissive. This may include, for example, using display control circuitry 30 to adjust the electric field across layer 94 (FIG. 14) such that all of backlight 44 incident upon structures 62B overlapping the pixel is transmitted and allowed to reach the pixel. Processing may then proceed to step 312.

If it is determined during step 306 that the input gray level is less than the light leakage threshold gray level LL, processing proceeds to step 310.

At step 310, display control circuitry 30 may activate light leakage reduction structures 62B such that the local dimming element 62L under the display pixel is only partially transmissive, thereby reducing the intensity of backlight that reaches the display pixel. This may include, for example, using display control circuitry 30 to adjust the electric field across layer 94 (FIG. 14) such that a portion of backlight 44 incident upon structures 62B overlapping the pixel is blocked from reaching the pixel. Processing may then proceed to step 312.

At step 312, display control circuitry 30 may drive the display pixel according to a modified gray level mapping function such as modified gray level mapping function 15B of FIG. 9. The intensity of backlight received by the display pixel and the transmissivity of the display pixel may be coordinated such that the intensity of light displayed by the display pixel corresponds to the input gray level.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a display having an array of display pixels, wherein the array of display pixels comprises display pixels in a rectangular central region and display pixels in a border region surrounding the central region;
a backlight unit configured to provide backlight to the array of display pixels;
light leakage reduction structures configured to reduce an intensity of backlight received by the display pixels in the border region relative to an intensity of backlight received by the display pixels in the central region; and
display control circuitry configured to drive the display pixels in the central region according to a gray level mapping function and to drive the display pixels in the border region according to a modified gray level mapping function, wherein the gray level mapping function determines first pixel transmissivity levels based on digital input gray levels, and wherein the modified gray level mapping function determines second pixel transmissivity levels that are different from the first pixel transmissivity levels based on the digital input gray levels.

2. The electronic device defined in claim 1 wherein the light leakage reduction structures comprise a shutter module interposed between the backlight unit and the array of display pixels.

3. The electronic device defined in claim 2 wherein the shutter module comprises a polymer-dispersed liquid crystal layer.

4. The electronic device defined in claim 2 wherein gray level mapping function and the modified gray level mapping function are the same for digital input gray levels above a threshold gray level.

5. The electronic device defined in claim 1 wherein the backlight unit comprises a light guide plate and wherein the light leakage reduction structures comprise light-scattering features in the light guide plate having a gradient density along a surface of the light guide plate.

6. The electronic device defined in claim 5 wherein the density of the light-scattering features under the display pixels in the border region is less than the density of light-scattering features under the display pixels in the central region.

7. The electronic device defined in claim 1 wherein the first pixel transmissivity levels are the same as the second pixel transmissivity levels for digital input gray levels above a threshold gray level.

8. The electronic device defined in claim 7, wherein the first pixel transmissivity levels are different from the second pixel transmissivity levels for digital input gray levels below the threshold gray level.

9. A method for displaying a gray level on a display pixel in a display having an array of display pixels, wherein the array of display pixels comprises display pixels in a central region of the display and display pixels in a border region of the display that surrounds the central region, the method comprising:
with a backlight unit, providing backlight to the array of display pixels, wherein the intensity of backlight received by the display pixels in the border region of the display is lower than the intensity of backlight received by the display pixels in the central region of the display;
with display control circuitry, determining whether the display pixel is in the border region of the display;
in response to determining that the display pixel is not in the border region of the display, driving the display pixel according to a gray level mapping function; and
in response to determining that the display pixel is in the border region of the display, driving the display pixel according to a modified gray level mapping function, wherein the gray level mapping function and the modified gray level mapping function map digital input gray levels to pixel transmissivity levels, and wherein the gray level mapping function and the modified gray level mapping function map a first digital input level to different pixel transmissivity levels.

10. The method defined in claim 9 wherein the backlight unit comprises a light guide plate having light-scattering features, wherein the light-scattering features are configured such that the display pixels in the border region receive a reduced backlight intensity compared to the display pixels in the central region, and wherein driving the display pixel according to the modified gray level mapping function comprises compensating for the reduced backlight intensity.

11. The method defined in claim 9 further comprising:
in response to determining that the display pixel is in the border region of the display, activating a shutter module interposed between the display pixel and the backlight unit to block a portion of the backlight so that the intensity of backlight received by the display pixels in the border region of the display is lower than the intensity of backlight received by display pixels in the central region of the display.

12. The method defined in claim 11 wherein the shutter module comprises a polymer-dispersed liquid crystal layer and wherein activating the shutter module comprises adjusting an electric field across the polymer-dispersed liquid crystal layer.

13. The method defined in claim 9, wherein the gray level mapping function maps the first digital input level to a first pixel transmissivity level, and wherein the modified gray level mapping function maps the first digital input level to a second pixel transmissivity level that is different than the first pixel transmissivity level.

14. The method defined in claim 9, wherein the display pixels in the border region of the display and the display pixels in the central region of the display are matrix addressable.

15. A method for displaying a gray level on a display pixel in a display having an array of display pixels, wherein the array of display pixels comprises display pixels in a central region of the display and display pixels in a border region of the display that surrounds the central region, the method comprising:
with the display control circuitry, determining whether the display pixel is in the border region of the display;
in response to determining that the display pixel is not in the border region of the display, driving the display pixel according to a gray level mapping function, wherein the gray level mapping function maps digital input gray levels to first pixel transmissivity levels; and
in response to determining that the display pixel is in the border region of the display:
with display control circuitry, determining whether a digital input gray level is below a threshold gray level;
in response to determining that the digital input gray level is below the threshold gray level, activating a shutter module to reduce an intensity of backlight received by the display pixel; and with the display control circuitry, driving the display pixel according to a modified gray level mapping function, wherein the modified gray level mapping function maps the digital input gray levels to second pixel transmissivity levels that are different than the first pixel transmissivity levels.

16. The method defined in claim 15 further comprising:
with a backlight unit, providing the backlight to the array of display pixels, wherein the shutter module is interposed between the backlight unit and the array of display pixels.

17. The method defined in claim 16 wherein driving the display pixel according to a modified gray level mapping function comprises compensating for the reduced intensity of backlight received by the display pixel.

18. The method defined in claim 15 wherein the shutter module comprises a polymer-dispersed liquid crystal layer and wherein activating the shutter module comprises adjusting an electric field across the polymer-dispersed liquid crystal layer so that the polymer-dispersed liquid crystal layer is only partially transmissive.

19. The method defined in claim 15 wherein the shutter module comprises a polymer-dispersed liquid crystal layer and wherein deactivating the shutter module comprises adjusting an electric field across the polymer-dispersed liquid crystal layer so that the polymer-dispersed liquid crystal layer is fully transmissive.

\* \* \* \* \*